United States Patent
Kim

(10) Patent No.: US 12,110,631 B2
(45) Date of Patent: Oct. 8, 2024

(54) STEAM IRONING SYSTEM FOR VEHICLE SEAT COVER

(71) Applicant: HANUL SYSTEM CO., LTD., Daegu (KR)

(72) Inventor: Ho Young Kim, Daegu (KR)

(73) Assignee: HANUL SYSTEM CO., LTD., Daegu (KR)

( * ) Notice: Subject to any disclaimer, the term of this patent is extended or adjusted under 35 U.S.C. 154(b) by 70 days.

(21) Appl. No.: 17/971,035

(22) Filed: Oct. 21, 2022

(65) Prior Publication Data
US 2023/0128707 A1 Apr. 27, 2023

(30) Foreign Application Priority Data
Oct. 22, 2021 (KR) .................. 10-2021-0142138

(51) Int. Cl.
*D06F 71/34* (2006.01)
*B25J 11/00* (2006.01)
*B60S 3/00* (2006.01)

(52) U.S. Cl.
CPC .............. *D06F 71/34* (2013.01); *B25J 11/005* (2013.01); *B60S 3/008* (2013.01)

(58) Field of Classification Search
CPC .......... D06F 71/34; D06F 71/00; D06F 71/04; D06F 71/32; D06F 71/36; D06F 75/00;
(Continued)

(56) References Cited

U.S. PATENT DOCUMENTS

| 4,166,331 A * | 9/1979 | Wallace | D06F 81/08 38/15 |
| 6,405,461 B1 * | 6/2002 | Groel | B60S 3/008 38/1 A |

(Continued)

FOREIGN PATENT DOCUMENTS

| DE | 10128662 A1 * | 12/2002 | B60N 2/5891 |
| KR | 20-0417397 Y1 | 5/2006 | |

(Continued)

OTHER PUBLICATIONS

International Search Report dated Jan. 19, 2023 in International Application No. PCT/KR2022/014574.

*Primary Examiner* — Ismael Izaguirre
(74) *Attorney, Agent, or Firm* — Sughrue Mion, PLLC

(57) ABSTRACT

An embodiment of the present invention provides a steam ironing system for a vehicle seat cover, which comprises a steam tank for heating water to generate steam; a steam injection assembly for receiving the steam generated from the steam tank and injecting the steam to the vehicle seat at a predetermined interval from the vehicle seat; an automated robot for guiding a movement of the steam injection assembly; a steam ironing assembly, coupled to a robot mounting unit provided in the automated robot with the steam injection assembly, for receiving the steam generated from the steam tank and ironing the vehicle seat; a steam supplying unit for supplying the steam to the steam injection assembly or the steam ironing assembly, one end thereof being connected to the steam tank; a water recovery unit detachably connected to the steam supplying unit, for recovering water generated in the steam supplying unit during a steam supplying process; a steam supply controlling unit for selectively supplying the steam via the water recovery unit to the steam injection assembly or the steam ironing assembly; and (Continued)

a recovery tank for storing water recovered from the water recovery unit.

6 Claims, 17 Drawing Sheets

(58) Field of Classification Search
CPC .......... D06F 75/06; D06F 75/10; D06F 75/20; D06F 75/22; D06F 79/02; B25J 11/005; B25J 11/00; B25J 13/00; B60S 3/008; B60S 3/00

See application file for complete search history.

(56) References Cited

U.S. PATENT DOCUMENTS

| | | | |
|---|---|---|---|
| 2002/0095827 A1 | 7/2002 | Rosa | |
| 2017/0268160 A1 | 9/2017 | Chua et al. | |
| 2017/0349429 A1* | 12/2017 | Sasaki | ..................... B60N 2/90 |

FOREIGN PATENT DOCUMENTS

| | | | | | |
|---|---|---|---|---|---|
| KR | 200417847 | Y1 | * | 5/2006 | |
| KR | 1438540 | B1 | * | 9/2014 | |
| KR | 1449926 | B1 | * | 10/2014 | |
| KR | 10-1542719 | B1 | | 8/2015 | |
| KR | 10-2255019 | B1 | | 5/2021 | |
| KR | 102266172 | B1 | * | 6/2021 | |
| KR | 10-2367079 | B1 | | 2/2022 | |
| WO | WO-2007067777 | A2 | * | 6/2007 | ........... B60N 2/5891 |

* cited by examiner (a)

(b)

→ HIGH-TEMPERATURE STEAM

STEAM IRONING SYSTEM FOR VEHICLE SEAT COVER

CROSS-REFERENCE TO RELATED APPLICATION

This application claims priority to and the benefit of Korean Patent Application No. 10-2021-0142138 filed on Oct. 22, 2021, the disclosure of which is incorporated herein by reference in its entirety.

TECHNICAL FIELD

The present invention relates to a steam ironing system for a vehicle seat cover. More specifically, the present invention relates to a steam ironing system for a vehicle seat cover configured to selectively use a steam injection assembly for discharging fine steam so as to prevent the seat cover from being stained due to moisture discharge, and a steam ironing assembly with an ironing unit to which a heating element is applied so as to minimize moisture discharge.

BACKGROUND ART

In general, when manufacturing a vehicle seat, a headrest and other adjusting devices, etc. are installed on a seat, and then a fabric or leather cover is placed on the outer periphery of the seat. In this case, since a lot of wrinkles are formed on the fabric or leather cover, an additional work of removing the wrinkles needs to be carried out.

In the past, in order to remove the wrinkles of the fabric or leather cover placed on the outer periphery of the seat, a worker did the ironing by injecting steam along the cover while holding a steam injector by hand to remove the wrinkles one by one.

However, when removing wrinkles of the vehicle seat by the conventional method, the wrinkles of the cover placed on the outer periphery of the seat were not completely removed, the work efficiency deteriorated, the defective rate of the seat due to damage of the cover was high, and even workplace accidents were a concern.

Accordingly, various studies have been done on a steam ironing system for a vehicle cover seat configured to effectively remove wrinkles generated on the vehicle seat by using robots, instead of handwork.

PRIOR ART REFERENCE

Patent Document (Patent Document 0001) Prior Document 1: Korean Registered Utility Model No. 20-0417397 (May 22, 2006)

DETAILED DESCRIPTION OF INVENTION

Technical Task

The technical task of the present invention in order to solve the above-mentioned problem is to provide a steam ironing system for a vehicle seat cover configured to selectively use a steam injection assembly for discharging fine steam so as to prevent the seat cover from being stained due to moisture discharge, and a steam ironing assembly with an ironing unit to which a heating element is applied so as to minimize moisture discharge.

Means for Solving Technical Task

In order to achieve said technical task, an embodiment of the present invention provides a steam ironing system for a vehicle seat cover, which comprises a steam tank for heating water to generate steam; a steam injection assembly for receiving the steam generated from the steam tank and injecting the steam to the vehicle seat at a predetermined interval from the vehicle seat; an automated robot for guiding a movement of the steam injection assembly; a steam ironing assembly, coupled to a robot mounting unit provided in the automated robot with the steam injection assembly, for receiving the steam generated from the steam tank and ironing the vehicle seat; a steam supplying unit for supplying the steam to the steam injection assembly or the steam ironing assembly, one end thereof being connected to the steam tank; a water recovery unit detachably connected to the steam supplying unit, for recovering water generated in the steam supplying unit during a steam supplying process; a steam supply controlling unit for selectively supplying the steam via the water recovery unit to the steam injection assembly or the steam ironing assembly; and a recovery tank for storing water recovered from the water recovery unit.

According to an embodiment of the present invention, the steam injection assembly may comprise: a casing provided with an inner space; a blowing unit provided in the casing; a connection pipe coupled to the casing while forming a hollow; a heater unit provided in the connection pipe; a steam discharge guiding unit, coupled to the connection pipe, for guiding a blowing direction of air discharged from the blowing unit; a baffle, provided between the connection pipe and the steam discharge guiding unit, for dispersing hot air heated by the heater unit which moves from the connection pipe to the steam discharge guiding unit; and a first steam supplying pipe, provided inside the steam discharge guiding unit, for discharging the steam supplied from the steam supplying unit.

According to an embodiment, the first steam supplying pipe, provided inside the steam discharge guiding unit, may be formed to make a spiral along a longitudinal direction of the steam discharge guiding unit. A plurality of air moving holes having predetermined intervals may be formed in the heater unit, so that the air flowed into one end of the heater unit through the air moving hole is heated by the heater unit, and then discharged to another end of the heater unit.

According to an embodiment, the steam discharged from the first steam supplying pipe may be injected to the vehicle seat while being heated to a predetermined temperature or above by the hot air heated by the heater unit.

According to an embodiment of the present invention, the steam ironing assembly may comprise: an ironing unit which includes a plurality of steam injection holes, and a plurality of discharging pins provided to be in communication with the steam injection holes and has an inner passage; and at least one heating element, embedded in the ironing unit, for heating the water generated in the ironing unit for evaporation. The ironing unit may comprise an upper cover with at least one steam inlet in communication with a second steam supplying unit; and a lower ironing board coupled to the upper cover and formed with the discharging pin, and the upper cover and the lower ironing board may be coupled to each other so that a steam circulation space in which the steam circulates may be formed inside the ironing unit.

According to an embodiment of the present invention, the heating element may be made of a ceramic heater and may be insert-embedded in the lower ironing board.

According to an embodiment of the present invention, the steam ironing assembly may further comprise a water recovery port, provided in the upper cover, for recovering water generated in the ironing unit; a water recovery connecting pipe, connected to the water recovery port, for guiding the water generated in the ironing unit to the recovery tank; and a water moving groove formed along an inner periphery of the lower ironing board, and configured to move the water generated in the ironing unit towards the water recovery port, wherein at least one inclination part may be formed on the top of the discharging pin.

Effect of Invention

The effects of the steam ironing system for the vehicle seat cover according to the present invention explained above are as described below.

According to the present invention, since the steam injection assembly and the steam ironing assembly are provided together in the steam ironing system for the vehicle seat cover, a worker may selectively use the steam injection assembly or the steam ironing assembly according to the type and state of the seat cover, thereby effectively removing wrinkles formed on the seat cover.

Here, since the steam injection assembly has a heater unit provided therein, the steam discharged through the first steam supplying pipe may be steam injected while being heated to a predetermined temperature or above by the heater unit, thereby preventing the seat cover from being stained due to the moisture discharge.

Additionally, the steam ironing assembly is configured to have a steam ironing function using high-temperature steam and a heater function using heating, thereby safely ironing leather seats as well as general fabric seats without any damages.

The effects of the present invention are not limited to the above-mentioned effects, and it should be understood that the effects of the present invention include all effects that could be inferred from the configuration of the invention described in the detailed description of the invention or the appended claims.

BEST MODE FOR CARRYING OUT THE INVENTION

Figure 1:
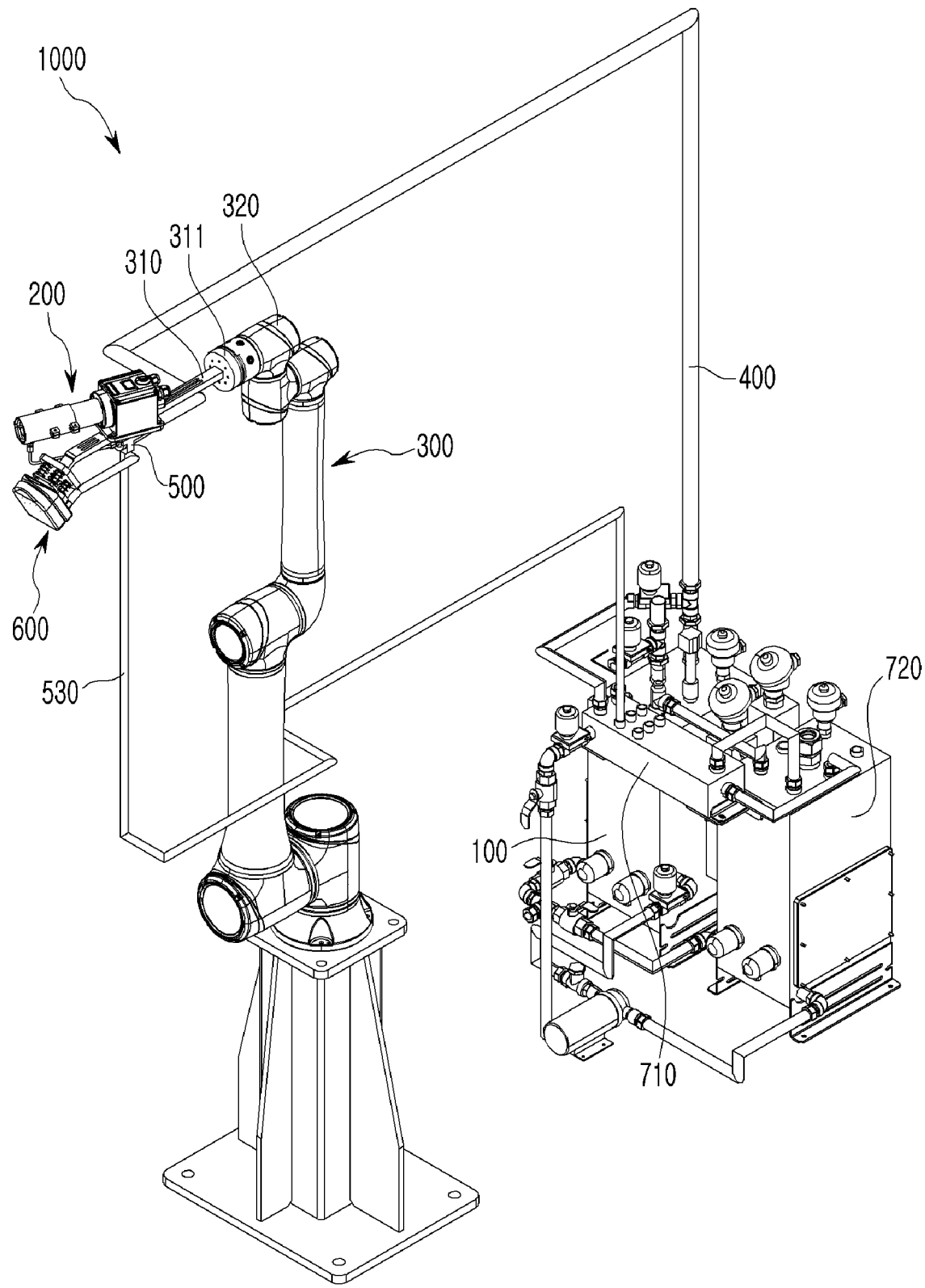
FIG. 1 is an exemplary view of a steam ironing system for a vehicle seat cover according to an embodiment of the present invention.

Hereinafter, the present invention will be explained with reference to the accompanying drawings. The present invention, however, may be modified in different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

The upper part and lower part used in the present invention mean a location above or below a subject member, and does not always mean the location above or below the subject member based on the gravity direction.

Hereinafter, embodiments of the present invention are explained in detail with reference to the drawings attached.

Figure 2:
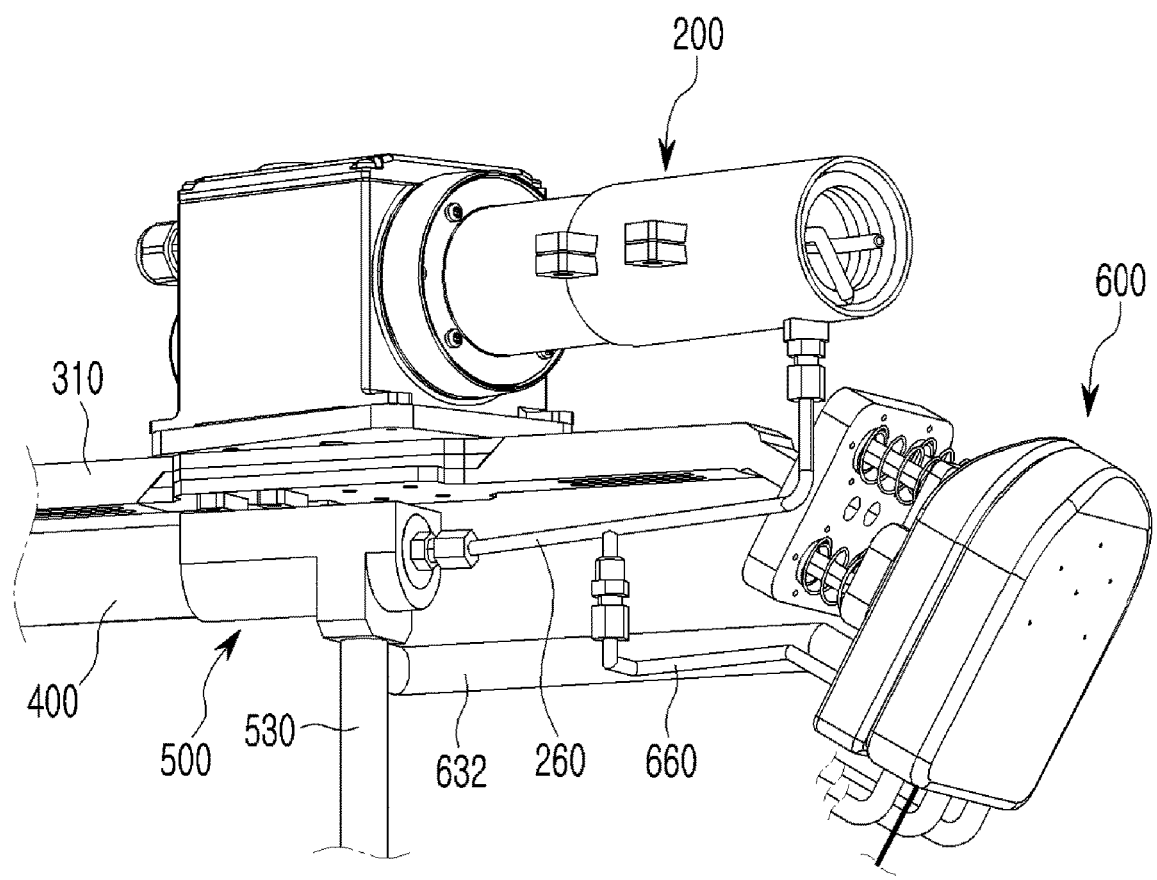
FIG. 2 is a perspective view of a steam injection assembly, a steam ironing assembly and a water recovery unit according to an embodiment of the present invention.
Figure 3:
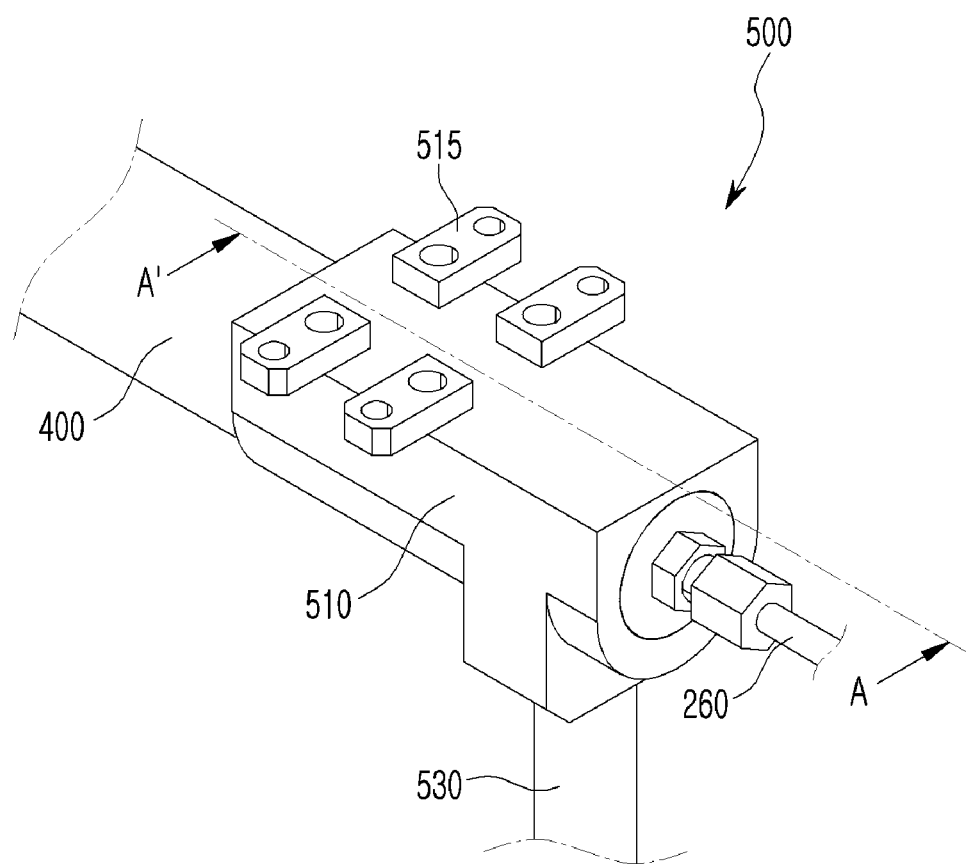
FIG. 3 is a perspective view of the water recovery unit according to an embodiment of the present invention.
Figure 4:
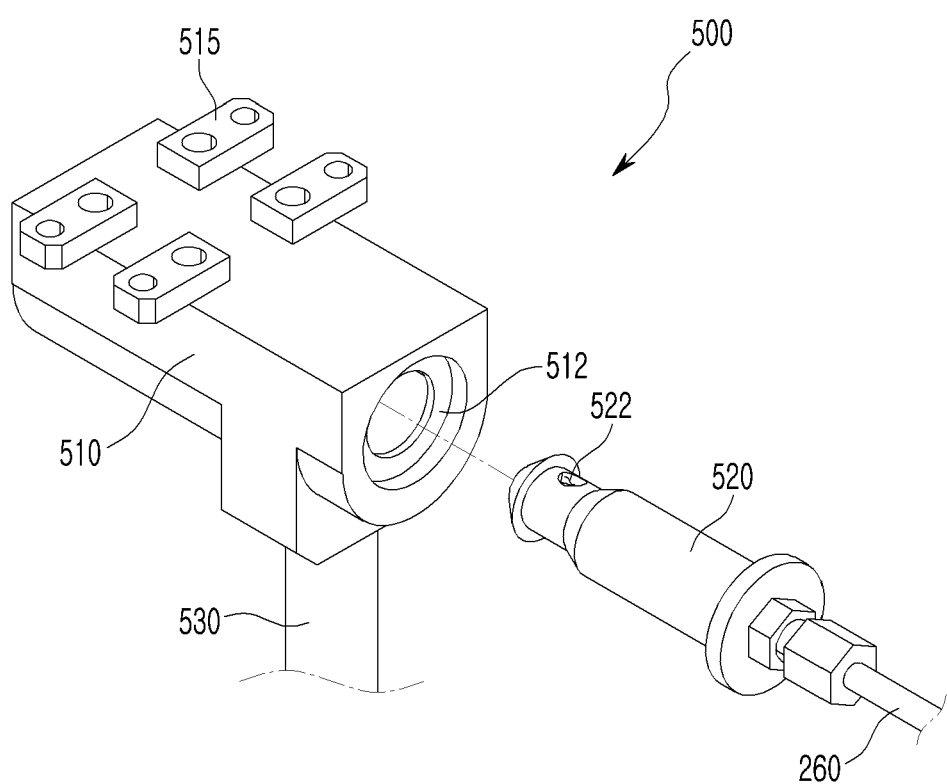
FIG. 4 is an exploded perspective view of the water recovery unit according to an embodiment of the present invention.
Figure 5:
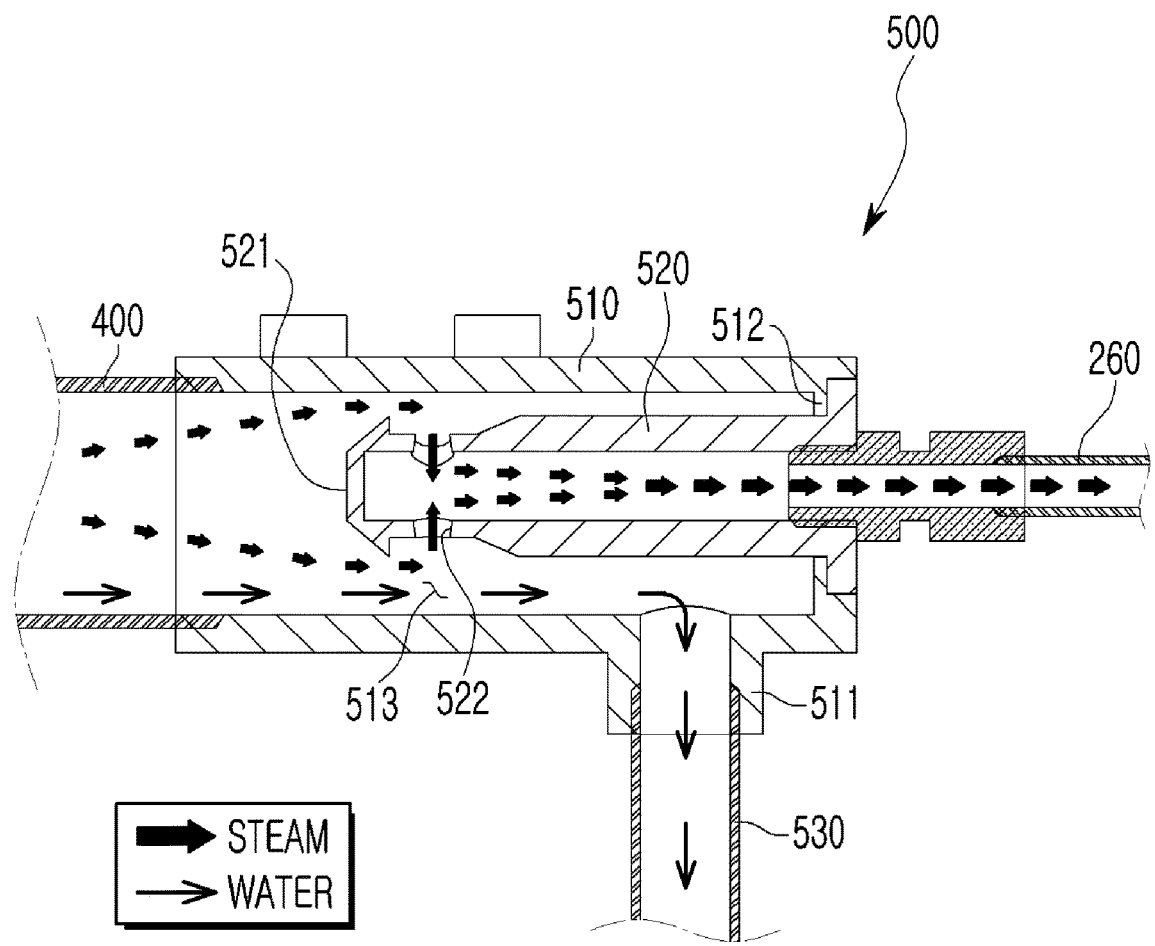
FIG. 5 is a cross-sectional view taken along lines A-A' of FIG. 3.

FIG. 1 is an exemplary view of a steam ironing system for a vehicle seat cover according to an embodiment of the present invention, FIG. 2 is a perspective view of a steam injection assembly, a steam ironing assembly and a water recovery unit according to an embodiment of the present invention, FIG. 3 is a perspective view of the water recovery unit according to an embodiment of the present invention, FIG. 4 is an exploded perspective view of the water recovery unit according to an embodiment of the present invention, and FIG. 5 is a cross-sectional view taken along lines A-A' of FIG. 3.

As illustrated in FIGS. 1 to 5, a steam ironing system 1000 for a vehicle seat cover may comprise a steam tank 100, a steam injection assembly 200, an automated robot 300, a steam supplying unit 400, a water recovery unit 500, and a steam ironing assembly 600.

Here, the steam bank 100 is configured to generate steam provided to the steam injection assembly 200 or the steam ironing assembly 600. The steam generated from the steam tank 100 may be provided to the steam injection assembly 200 or the steam ironing assembly 600 through the steam supplying unit 400.

In addition, the automated robot 300 may be configured to control the movement of the steam injection assembly 200 or the steam ironing assembly 600 installed on a robot mounting unit 310. The robot mounting unit 310 has a mounting plate 311 at one side thereof, and may be mounted on a robot arm 320 of the automated robot 300.

The robot mounting unit 310 coupled to the multi-joint robot arm 320 may be automatically moved to various locations required by the operation of the robot arm 320. In other words, the robot arm 320 is configured to eventually move the steam injection assembly 200 or the steam ironing assembly 600 coupled to the robot mounting unit 310 to a required location.

Meanwhile, the steam injection assembly 200 is coupled to another side of the robot mounting unit 310.

The steam injection assembly 200 is configured to inject the steam to the vehicle seat at a predetermined interval from the vehicle seat (not illustrated). Here, the vehicle seat is covered with the seat cover, and materials of the seat cover may be various materials such as leather or fabric.

The steam injection assembly 200 is configured to inject fine steam having a predetermined temperature to the seat cover provided at the outer side of the vehicle seat, thereby effectively removing wrinkles generated on the seat cover. The detailed constitution of the steam injection assembly 200 will be explained later.

Meanwhile, the steam supplying unit 400 is configured to supply the steam generated from the steam tank 100 to the steam injection assembly 200 or the steam ironing assembly 600.

The steam supplying unit 400 may be formed to have a hosepipe structure. One side thereof is connected to the steam tank 100 which heats water by a heating source such as electricity, etc. to generate the steam, and another side thereof supplies the steam supplied from the steam tank 100 to the steam injection assembly 200 or the steam ironing assembly 600.

Here, the steam generated from the steam tank 100 is discharged to the steam injection assembly 200 or the steam ironing assembly 600 through the steam supplying unit 400. As the corresponding steam moves along the steam supplying unit 400, a part thereof may be phase changed to water by the difference in pressure and outside temperature. In other words, when the water generated during the steam supplying process moves to the steam injection assembly 200 or the steam ironing assembly 600 to be discharged to the outside, the vehicle seat may be stained, and in a severe case, a surface of the seat may be damaged. Accordingly, a water recovery unit configured to recover the water generated during the steam supplying process is required.

The steam ironing system 1000 for vehicle seat cover may comprise a water recovery unit configured to recover again water phase changed from the steam which is moving to the steam supplying unit 400, and the water recovery unit may be provided at a front end side and a rear end side of the steam supplying unit 400, respectively. Here, the number of the water recovery unit is not limited to a specific number, and a plurality of water recovery units may be provided on the steam supplying unit 400. As far as the water phase changed from the steam is effectively recovered, the water recovery unit may have any structure.

Also, the water recovered through the water recovery unit 500 may be supplied to a water supply tank 720 via a recovery tank 710 through a water recovery pipe 530. As a plurality of water recovery units are provided in the steam supplying unit 400, it is possible to prevent water whose phase has changed from steam from being discharged to the vehicle seat through the steam injection assembly 200 or the steam ironing assembly 600.

In the steam ironing system 1000 for the vehicle seat cover, as an example, the water recovery units are respectively provided in a front side and a rear side of the steam supplying unit 400. In the present invention, detailed explanation on the water recovery unit provided in the front side of the steam supplying unit 400 will be omitted, and only the constitution corresponding to the water recovery unit 500 provided in the rear side of the steam supplying unit 400 will be explained in detail.

The water recovery unit 500 provided in the rear side of the steam supplying unit 400 recovers the water generated during the steam supplying process, and thus the corresponding water recovery unit 500 is configured to be detachably connected to the steam supplying unit 400.

The water recovery unit 500 may comprise a housing body 510, an inner pipe 520, and a water recovery pipe 530.

Here, an annular blocking wall 512 may be formed along a circumference of an inner wall of the housing body 510, and an inner pipe 520 may be inserted and coupled between the blocking walls 512.

A travel passage 513 may be formed in the inner passage of the housing body 510 by the blocking wall 512, and a water recovery inlet 511 may be branched in the travel passage 513.

Meanwhile, one side in the steam entry direction of the inner pipe 520 may have a clogging structure in which the blocking unit 521 is formed, and a steam entering hole 522 may be formed in an outer surface of the inner pipe 520 located at the travel passage 513 side.

In other words, the steam that enters through the steam inlet formed in one end of the housing body 510 moves in the steam discharging direction only through the inner pipe 520 by the blocking wall 512. In this case, the steam bypasses the blocking unit 521 due to the front clogging structure of the inner pipe 520, and enters the inside of the inner pipe 520 through the steam entering hole 522 formed in the outer surface of the inner pipe 520.

The water generated during the steam supplying process is blocked by the blocking wall 512 of the housing body 510 and the blocking unit 521 of the inner pipe 520, flows down the wall surface of the travel passage 513 to be collected at the bottom, and then is discharged to the recovery tank 710 through the water recovery inlet 511 and the water recovery pipe 530 by the weight of water itself and inner steam pressure.

Meanwhile, the housing body 510 may be coupled to the robot mounting unit 310 through at least one fixed coupling unit 515 provided at the top. The steam ironing system 1000 for the vehicle seat cover of the present invention may be configured to naturally discharge the water generated during the steam supplying process.

Figure 6:
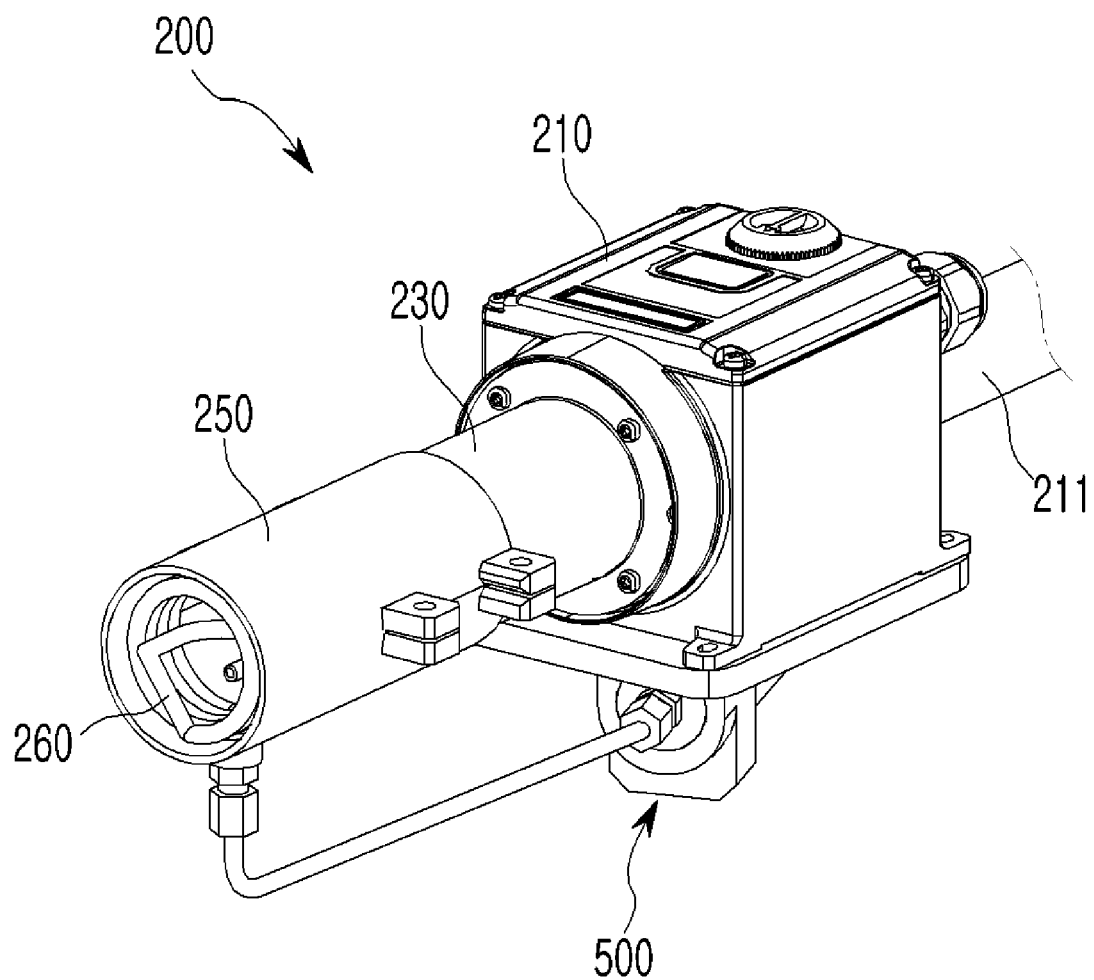
FIG. 6 is a perspective view of the steam injection assembly viewed from the front according to an embodiment of the present invention.
Figure 7:
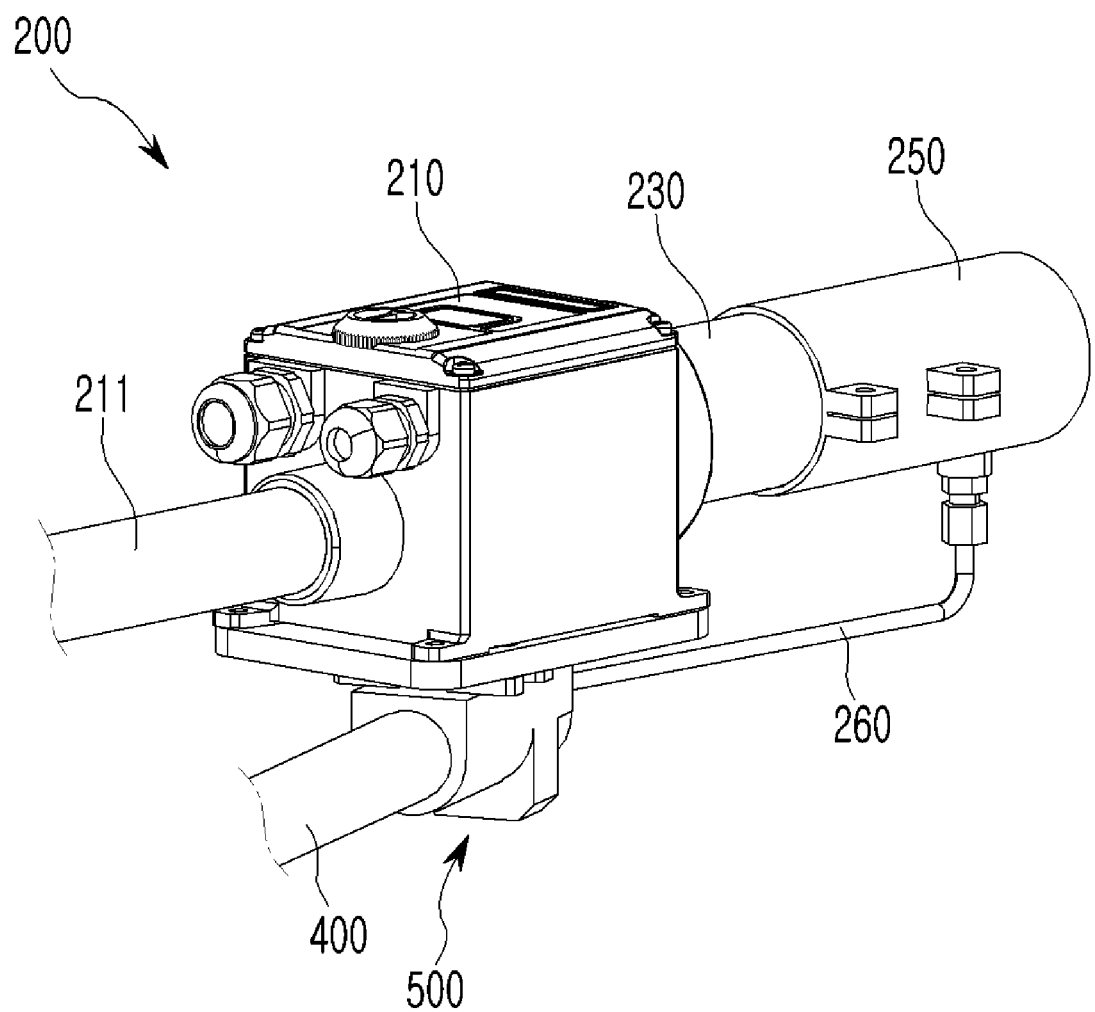
FIG. 7 is a perspective view of the steam injection assembly viewed from the back according to an embodiment of the present invention.
Figure 8:
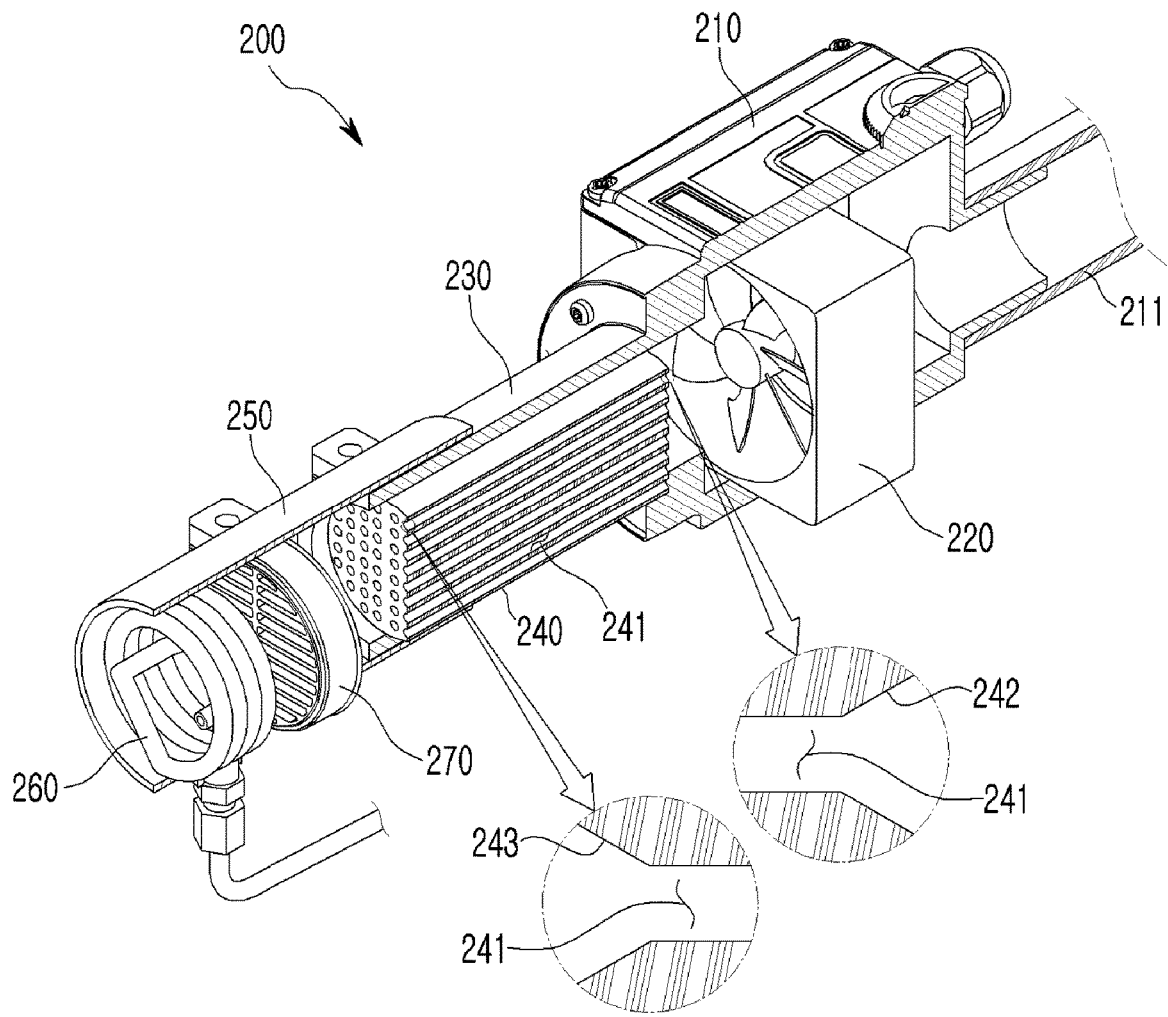
FIG. 8 is a cutaway perspective view illustrating an inner constitution of the steam injection assembly according to an embodiment of the present invention.

FIG. 6 is a perspective view of the steam injection assembly viewed from the front according to an embodiment of the present invention, FIG. 7 is a perspective view of the steam injection assembly viewed from the back according to an embodiment of the present invention, and FIG. 8 is a cutaway perspective view illustrating an inner constitution of the steam injection assembly according to an embodiment of the present invention.

As illustrated in FIGS. 6 to 8, the steam injection assembly 200 may comprise a casing 210, a blowing unit 220, a connection pipe 230, a heater unit 240, a steam discharge guiding unit 250, and a first steam supplying pipe 260.

Here, the casing 210 has an inner space provided therein.

The blowing unit 220 may be disposed in the inner space. The blowing unit 220 may be a fan, for example.

Since an external air inlet 211 is coupled to one side of the casing 210, when operating the blowing unit 220, the air flowing into the casing 210 through the external air inlet 211 may be discharged towards the connection pipe 230 coupled to another side of the casing 210. The air flowed in through the external air inlet 211 may be, for example, air in which dust, foreign substances, etc. are filtered.

Additionally, the connection pipe 230 forms a hollow, and is coupled to another side of the casing 210. The connection pipe 230 is formed to be in communication with the inner space of the casing 210, and thus the air supplied from the casing 210 may be moved to the steam discharge guiding unit 250 through the connection pipe 230.

Also, the heater unit 240 is provided in the connection pipe 230. The heater unit 240 may be a heating element which is heated by electricity, etc., for example. The heater unit 240 is configured to adjust the temperature of the discharged steam so that the steam discharged from the steam injection assembly 200 may be discharged at a predetermined temperature or above. In this case, the temperature of the fine steam discharged to the outside of the steam injection assembly 200 while being heated by the heater unit 240 is preferably 200-220° C. This is because, when the temperature of the fine steam discharged to the outside through the steam injection assembly 200 is less than 200° C., the wrinkles of the seat cover would not be effectively removed, and when the temperature of the fine steam discharged to the outside through the steam injection assembly 200 exceeds 220° C., the seat cover could be damaged.

In the heater unit 240, a plurality of air moving holes 241 are formed at predetermined intervals. Here, the air moving hole 241 is formed along the longitudinal direction of the heater unit 240, and is formed to penetrate the heater unit 240. The air moving hole 241 is configured to discharge the air flowed into one side of the heater unit 240 to another side of the heater unit 240 while being heated to a constant temperature.

Here, a first tapering unit 242 may be formed in one end of the air moving hole 241, and a second tapering unit 243 may be formed in another end of the air moving hole 241. The first tapering unit 242 and the second tapering unit 243 may be formed to have diameters gradually larger than the air moving hole 241 as the first tapering unit 242 and the second tapering unit 243 get farther from the air moving hole 241. Accordingly, the air inside the casing 210 may be effectively moved to the air moving hole 241 by the first tapering unit 242, and the air discharged from the air moving hole 241 to the steam discharge guiding unit 250 may be spread in a broader scope by the second tapering unit 243, thereby enabling uniform air discharge.

The air moving hole 241 may maintain the temperature and pressure of the air required for the air supplied from the casing 210 to the connection pipe 230. In other words, as a plurality of air moving holes 241 having a predetermined diameter are formed in the heater unit 240, the temperature of the air moved to the connection pipe 230 via the heater unit 240 from the casing 210 may effectively rise to the air temperature required for the heater unit 240. That is, as the air moves from the casing 210 to the connection pipe 230, since the air via the air moving hole 241 has a broad contact area with the air moving hole 241, the air discharged to the connection pipe 230 may be effectively heated by the heater unit 240.

Additionally, as the air moving hole 241 is provided in the heater unit 240, the steam injection assembly 200 is configured to discharge air in the required hot air pressure state. In this case, the discharge pressure of the hot air discharged to the steam discharge guiding unit 250 by the blowing unit 220 may be greater than the discharge pressure of the steam which is moved through the first steam supplying pipe 260 and discharged. Therefore, the steam discharged from the first steam supplying pipe 260 may be effectively provided to the vehicle seat by the hot air even when the steam is far from the vehicle seat. Accordingly, the wrinkles formed on the vehicle seat may be effectively removed by the fine steam discharged from the steam injection assembly 200.

Meanwhile, the steam discharge guiding unit 250 is coupled to the connection pipe 230. The steam discharge guiding unit 250 is configured to guide a blowing direction of the air discharged from the blowing unit 220.

Additionally, the first steam supplying pipe 260 is configured to discharge the steam supplied from the steam supplying unit 400. The first steam supplying pipe 260 is provided inside the steam discharge guiding unit 250, and the steam discharged from the first steam supplying pipe 260 may be provided to the vehicle seat together with the hot air.

The first steam supplying pipe 260 is provided inside the steam discharge guiding unit 250, and is formed to make a spiral along a longitudinal direction of the steam discharge guiding unit 250.

Since the first steam supplying pipe 260 performs heating by the hot air which moves to the steam discharge guiding unit 250 via the heater unit 240, the phase change from the steam moved to the first steam supplying pipe 260 via the water recovery unit 500 to water may be prevented. Here, the first steam supplying pipe 260 is provided in the form of a spiral within the steam discharge guiding unit 250, and thus the contact area between the steam via the first steam supplying pipe 260 and the hot air becomes wider. Therefore, the heating effect of the steam may further increase.

On the contrary, in the past, the steam discharged to the first steam supplying pipe 260 could not maintain a predetermined temperature or above, and thus was condensed to water, and thereby the corresponding moisture was injected to the vehicle seat. In such case, the seat cover was stained.

In order to prevent such problem, in the present invention, the first steam supplying pipe 260 is continuously heated by the hot air provided from the blowing unit 220 and the heater unit 240. Accordingly, even when moisture exists in the first steam supplying pipe 260, the corresponding moisture evaporates by the hot air. Therefore, only fine steam may be discharged through the first steam supplying pipe 260. Accordingly, the problem of the seat cover getting stained due to moisture discharge during the conventional process of steaming the vehicle seat may be fundamentally prevented.

Meanwhile, the steam injection assembly 200 may further comprise a baffle 270 configured to disperse the air heated by the heater unit 240.

The baffle 270 is provided between the connection pipe 230 and the steam discharge guiding unit 250, and is configured to uniformly disperse the hot air discharged from the connection pipe 230 to the steam discharge guiding unit 250. In other words, the baffle 270 may be provided to uniformly discharge the air based on the longitudinal section of the steam discharge guiding unit 250. Therefore, the fine steam and hot air discharged through the steam injection assembly 200 may be evenly discharged without focusing on a specific portion of the seat cover.

Meanwhile, the steam supply controlling unit (not illustrated) is configured to selectively supply the steam via the water recovery unit 500 to the steam injection assembly 200 or the steam ironing assembly 600.

The steam supply controlling unit is configured to selectively open and close a first steam supplying pipe 260 connected to the steam injection assembly 200, and a second steam supplying pipe 600 connected to the steam ironing assembly 600. In other words, when a worker uses the steam injection assembly 200 to remove the wrinkles generated on the vehicle seat cover, the steam supply controlling unit opens the first steam supplying pipe 260, and the second steam supplying pipe 660 is kept closed, so that the steam moisture-processed from the water recovery unit 500 is controlled to be provided to the steam injection assembly 200.

On the other hand, when the worker removes the wrinkles generated on the vehicle seat cover through the steam ironing assembly 600, the steam supply controlling unit closes the first steam supplying pipe 260, and opens the second steam supplying pipe 660, so that the steam moisture-processed from the water recovery unit 500 is controlled to be provided to the steam ironing assembly 600.

The steam supply controlling unit, for example, may consist of valves which may selectively open and close the first steam supplying pipe 260 and the second steam supplying pipe 660.

Figure 9:
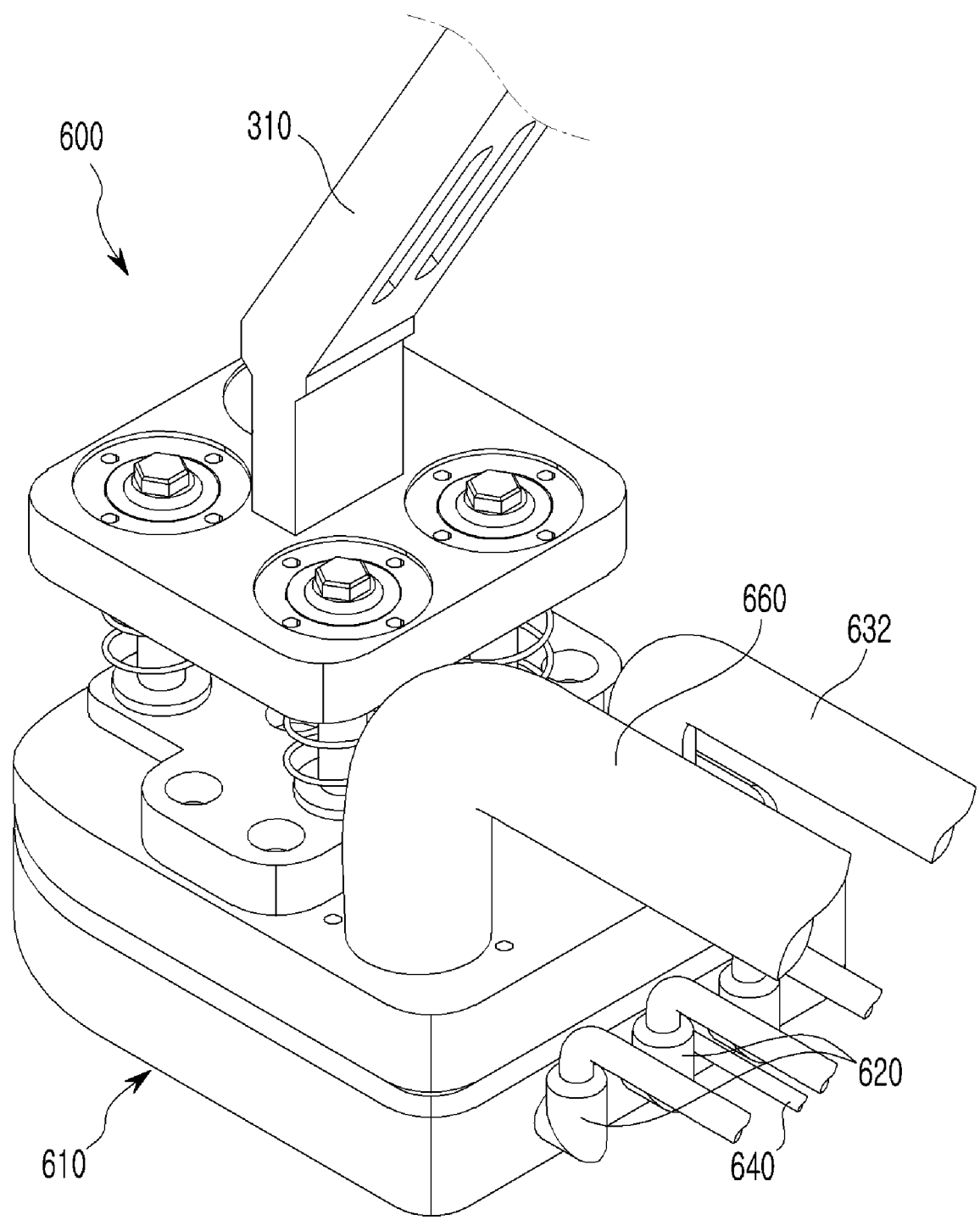
FIG. 9 is a perspective view illustrating one side of the steam ironing assembly according to an embodiment of the present invention.
Figure 10:
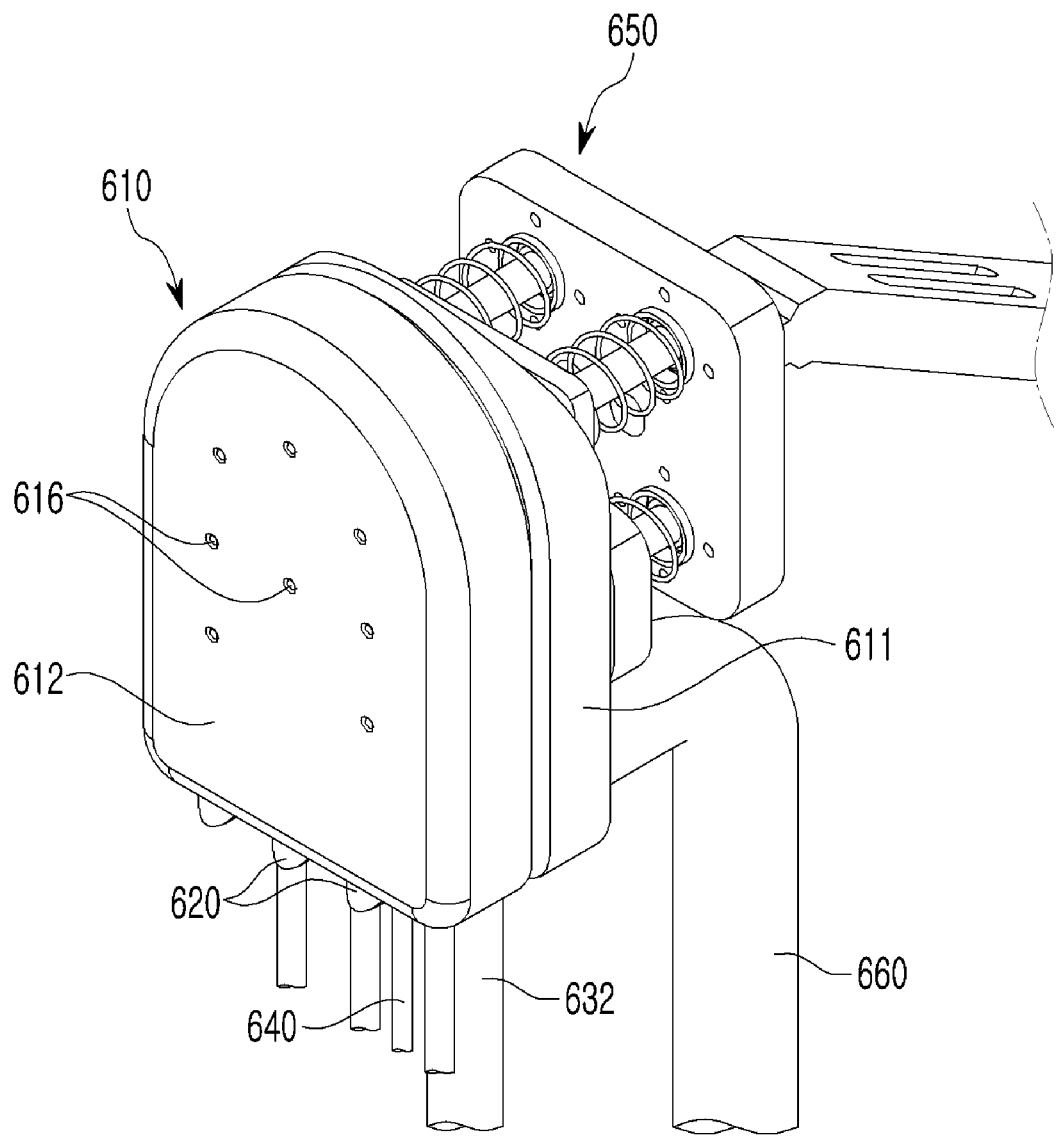
FIG. 10 is a perspective view illustrating another side of the steam ironing assembly according to an embodiment of the present invention.
Figure 11:
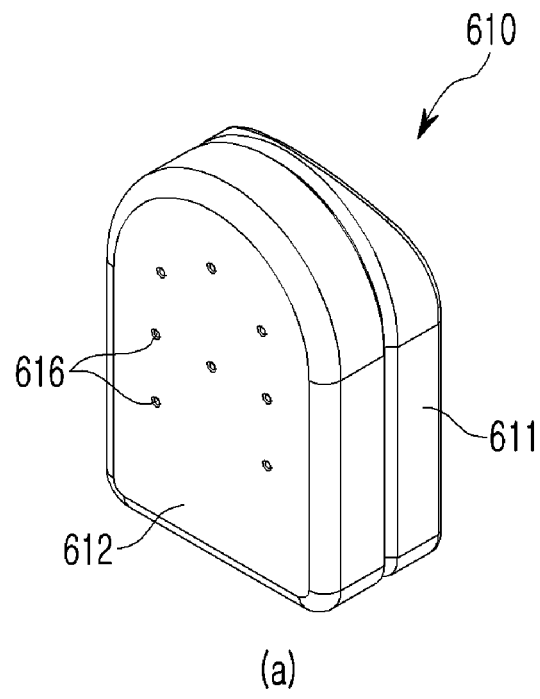
FIG. 11 is a perspective view of an ironing unit according to an embodiment of the present invention.
Figure 11:
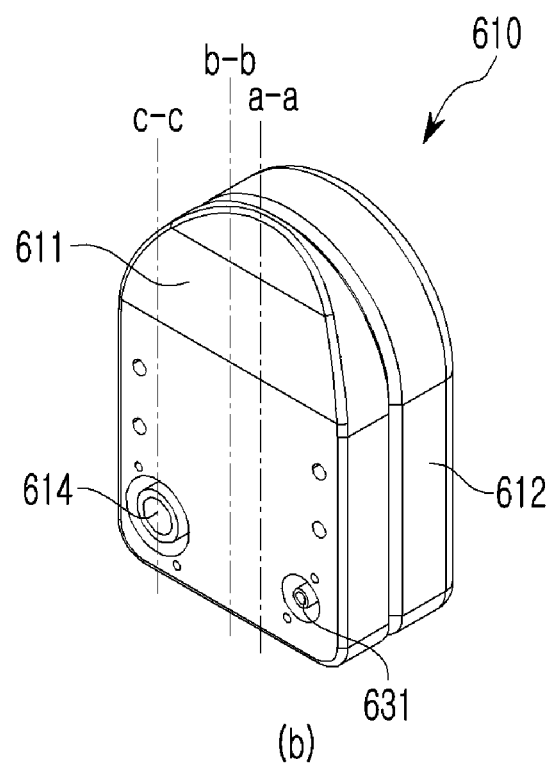
Figure 12:
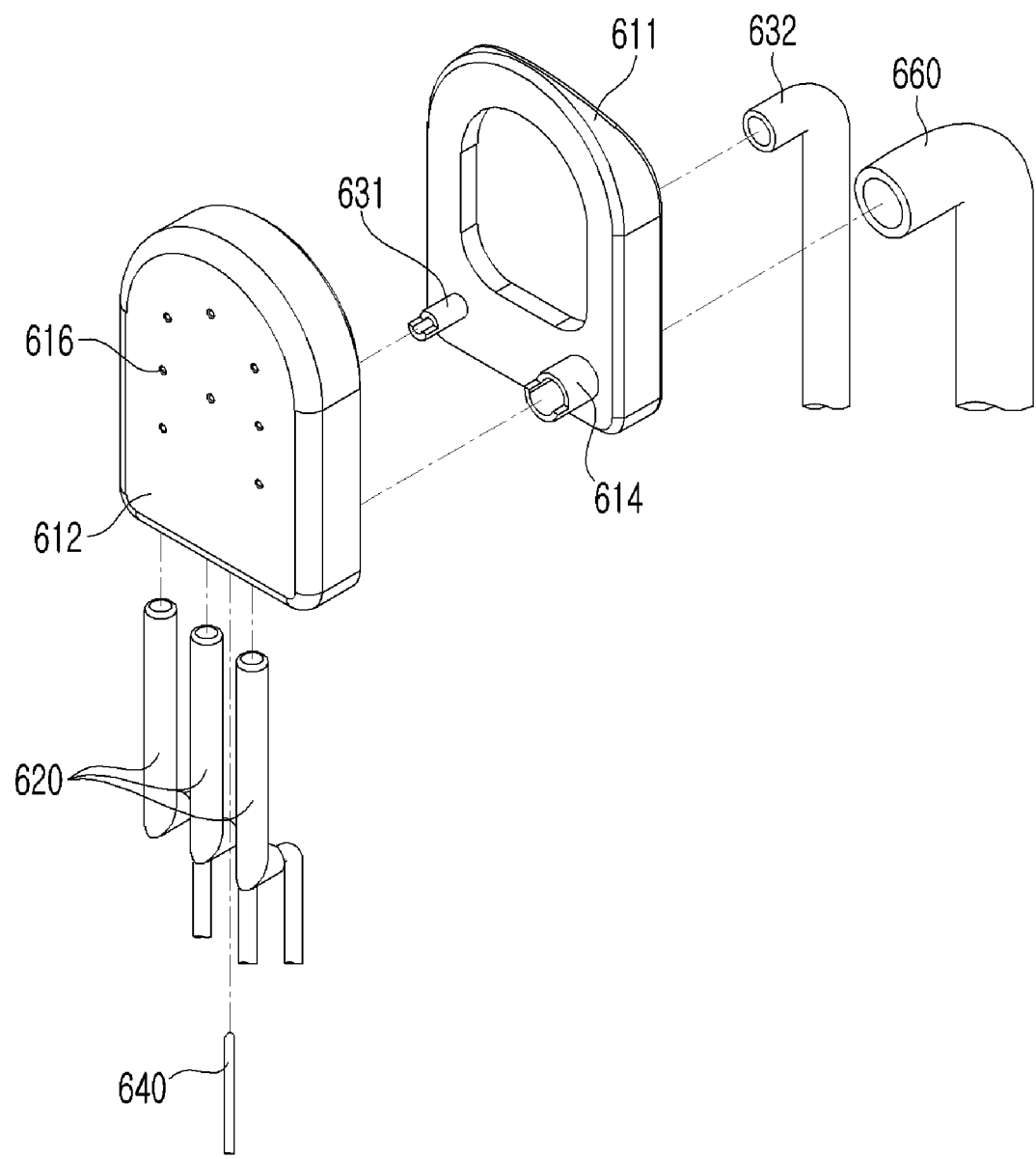
FIG. 12 is an exploded perspective view illustrating one side of the ironing unit according to an embodiment of the present invention.
Figure 13:
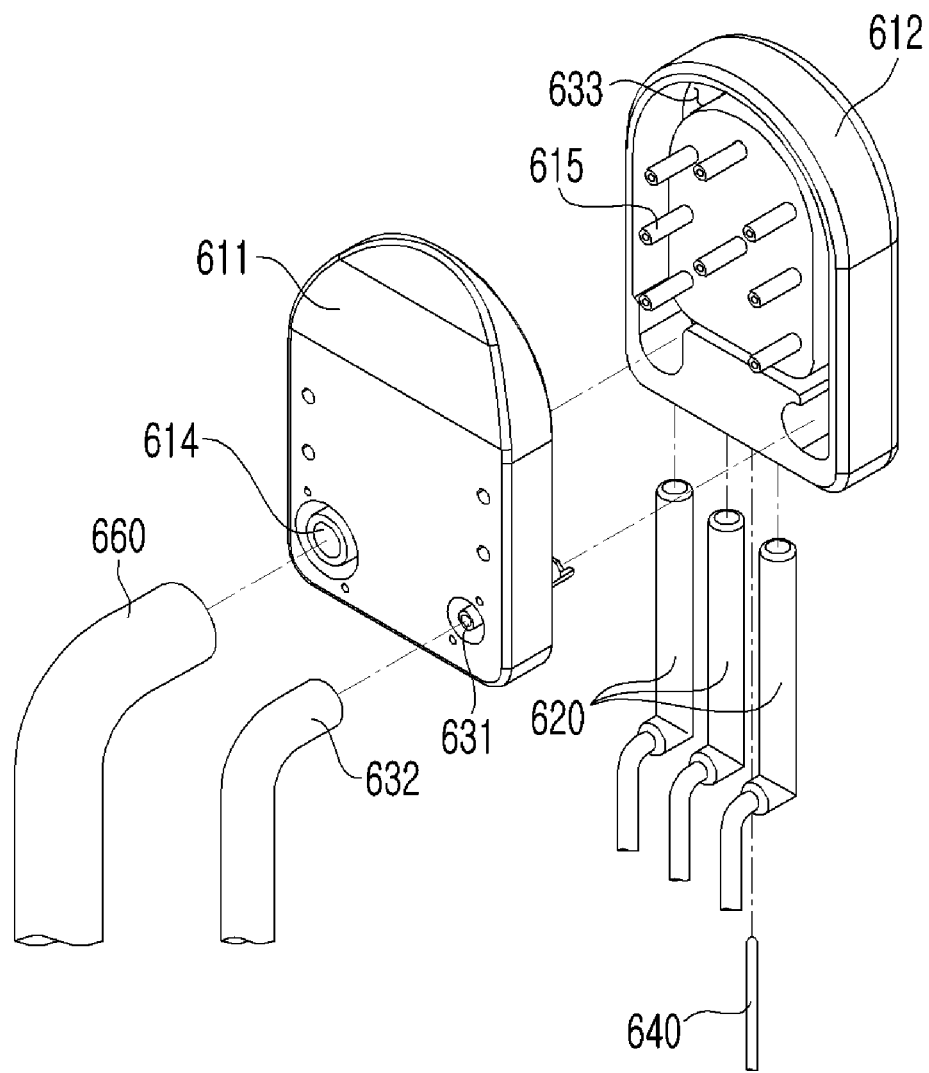
FIG. 13 is an exploded perspective view illustrating another side of the ironing unit according to an embodiment of the present invention.

FIG. 9 is a perspective view illustrating one side of the steam ironing assembly according to an embodiment of the present invention, FIG. 10 is a perspective view illustrating another side of the steam ironing assembly according to an embodiment of the present invention, FIG. 11 is a perspective view of an ironing unit according to an embodiment of the present invention, FIG. 12 is an exploded perspective view illustrating one side of the ironing unit according to an embodiment of the present invention, and FIG. 13 is an exploded perspective view illustrating another side of the ironing unit according to an embodiment of the present invention.

Referring to FIGS. 9 to 13, the steam ironing assembly 600 of the present invention may comprise an ironing unit 610 and a heating element 620.

As for general steam irons, part of the steam is changed to water due to the heat loss while delivering steam to the ironing unit, and accordingly, the steam particles injected get coarser and generate water.

The steam ironing assembly 600 of the present invention is configured to have a steam ironing function using high-temperature steam, and a heater function using heating, thereby safely ironing leather seats as well as general fabric seats without any damages. General fabric seats are ironed using high-temperature steam, and leather seats are ironed by using both high-temperature steam and a heater, thereby doing ironing without leaving any damages or marks on the leather.

In other words, the steam ironing assembly 600 of the present invention heats and evaporates the water generated while the high-temperature steam is delivered to the ironing unit 610 with a heating element 620 which is maintained at a temperature of about 150° C., thereby maintaining the steam particles injected to be fine, and preventing the seat cover from being stained due to the moisture.

Meanwhile, the ironing unit 610 comprises an upper cover 611 and a lower ironing board 612.

The upper cover 611 fixes the lower ironing board 612 while covering an upper part of the lower ironing board 612, and a steam inlet 614 serving as a passage for supplying the high-temperature steam to the inside of the ironing unit 610 is formed.

A lower surface of the lower ironing board 612 which is made of a flat metal plate, is mounted on the lower part of the upper cover 611, and is configured to iron the outer surface of the vehicle seat cover through the flat lower surface. The lower ironing board 612 includes a plurality of steam injection holes 616, and a plurality of discharging pins 615 provided to be in communication with the steam injection hole 616 and has an inner passage formed therein.

The steam circulation space is a place where the steam injected through the steam inlet 614 is stored and circulated. The lower ironing board 612 is heated by the high-temperature steam injected into the steam circulation space, thereby enabling steam ironing. The steam injection hole 616 of the lower ironing board 612 allows the steam injected into the steam circulation space to be injected into the lower surface of the lower ironing board 612 to do steam ironing.

The discharging pin 615 is provided in the lower ironing board 612 in which the steam injection hole 616 is formed, and forms a gap with the upper cover 611. Additionally, a plurality of steam injection holes 616 and a plurality of discharging pins 615 may be arranged in a plurality of rows in the lower ironing board 612.

In this case, at least one inclination part may be formed at the top of the discharging pin 615 so as to allow the steam to easily enter the inner passage. In other words, the high-temperature steam injected into the ironing unit 610 through the steam inlet 614 which is in communication with the second steam supplying pipe 660 flows around in the steam circulation space and then is injected to the outside through the inclination part of the discharging pin 615, the gap between the discharging pin 615 and the upper cover 611, the inner passage of the discharging pin 615, and the steam injection hole 616.

Figure 14:
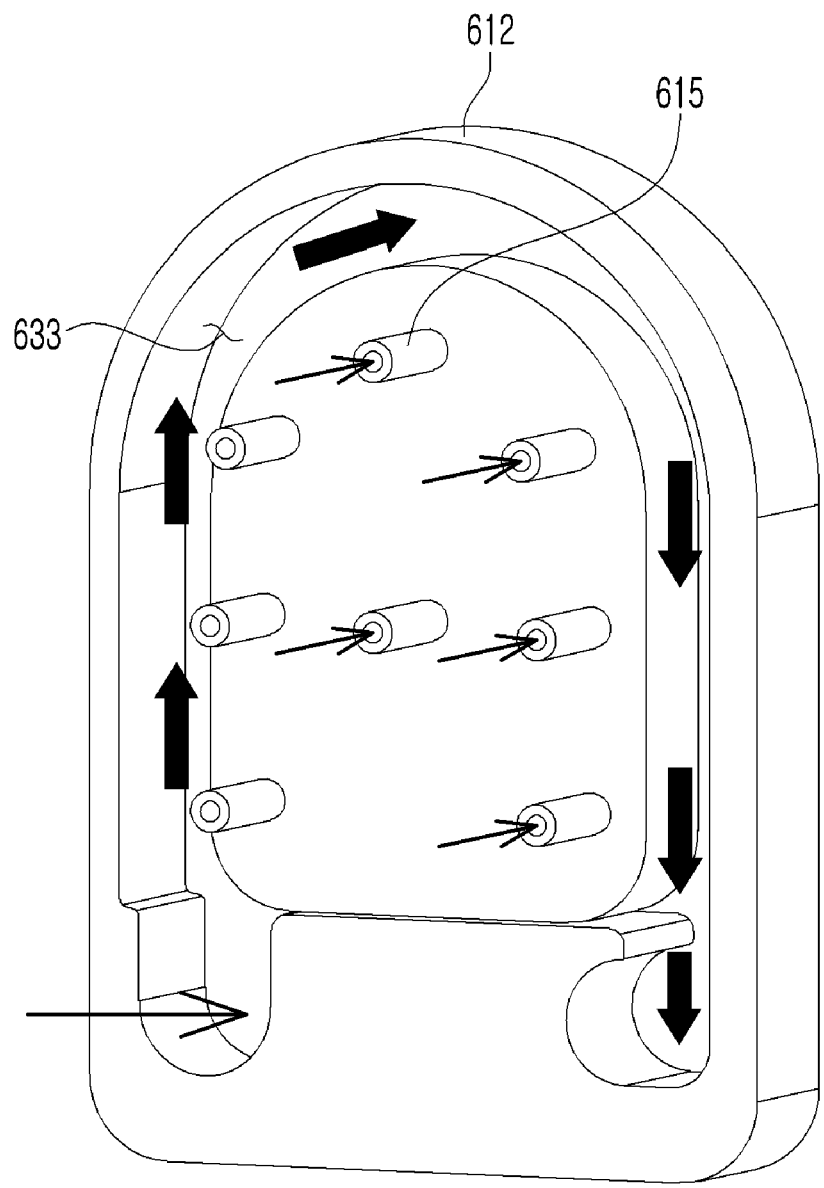
FIG. 14 is an exemplary view illustrating the inside of a lower ironing board according to an embodiment of the present invention.
Figure 15:
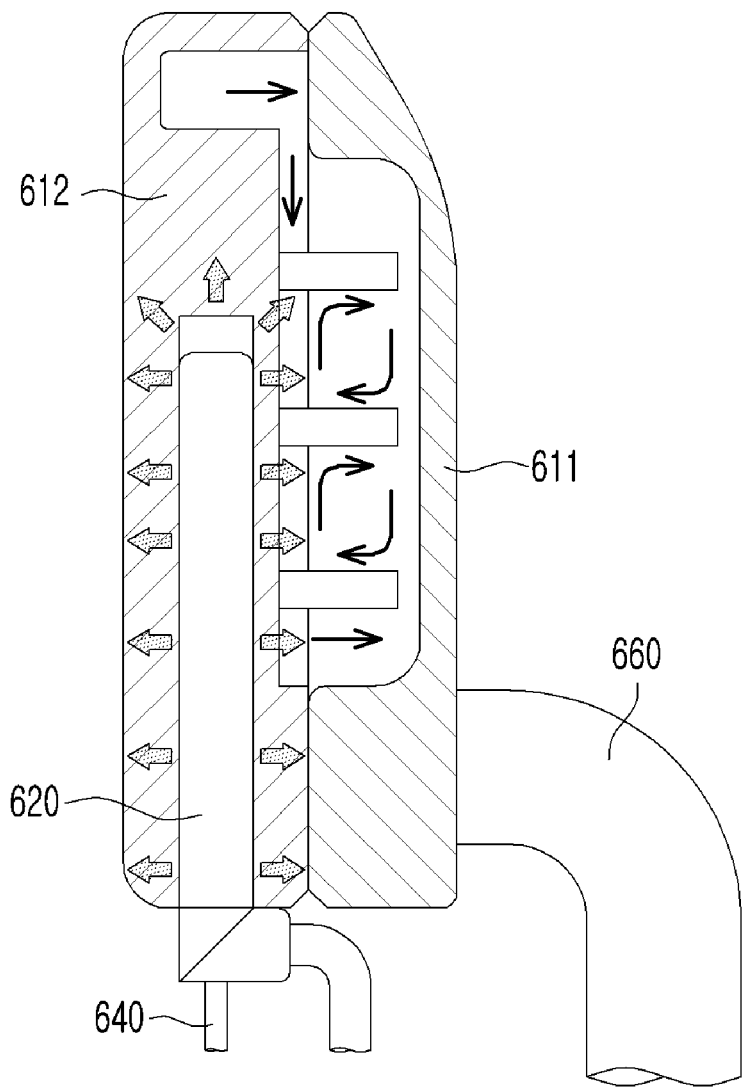
FIG. 15 is a cross-sectional view taken along lines a-a of FIG. 11 according to an embodiment of the present invention.
Figure 16:
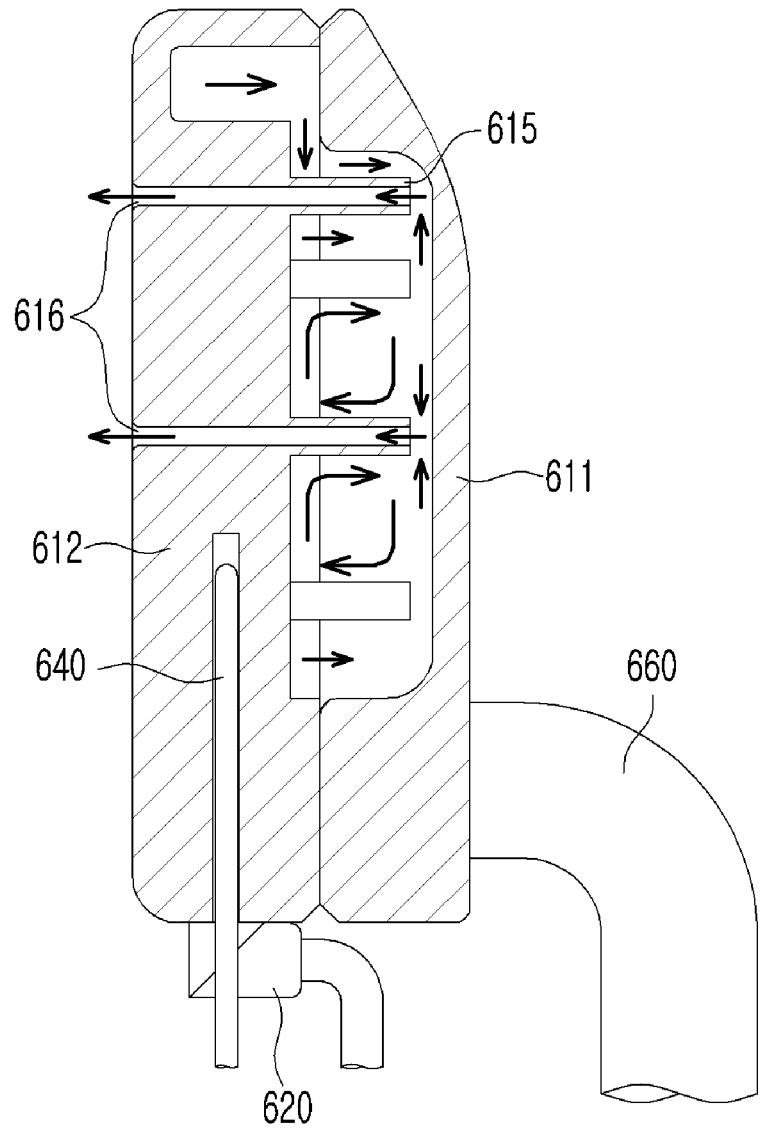
FIG. 16 is a cross-sectional view taken along lines b-b of FIG. 11 according to an embodiment of the present invention.
Figure 17:
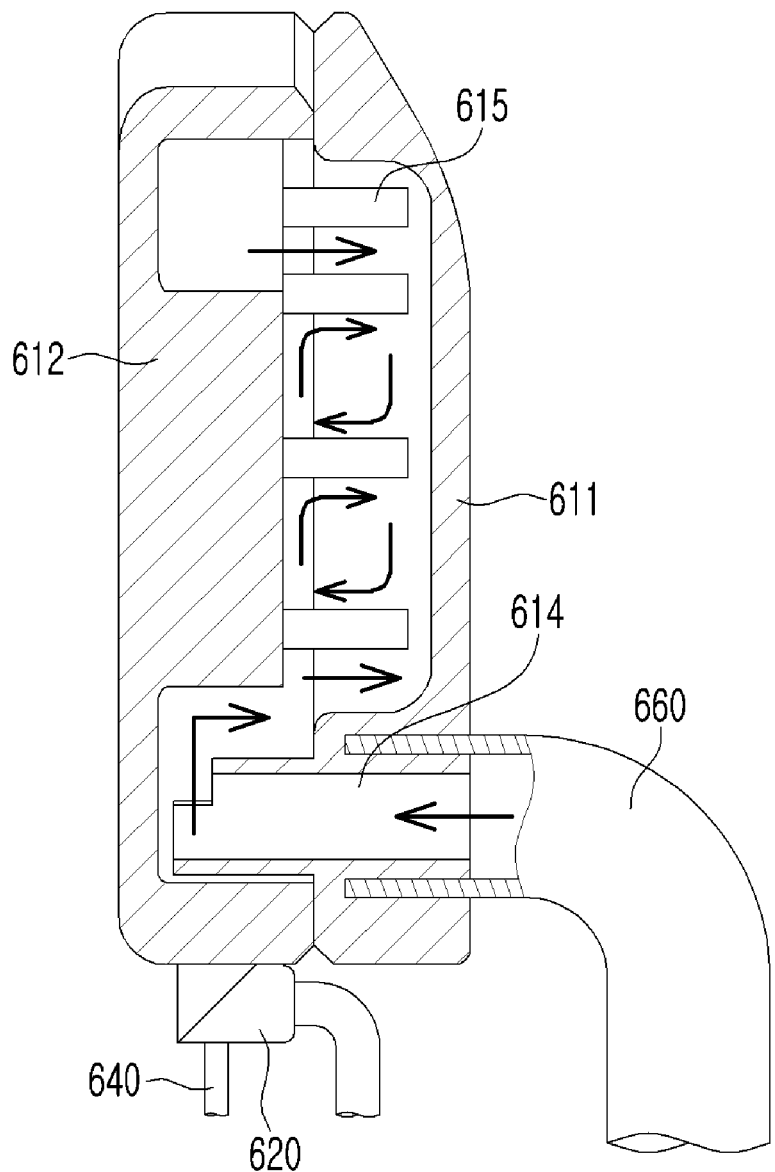
FIG. 17 is a cross-sectional view taken along lines c-c of FIG. 11 according to an embodiment of the present invention.

FIG. 14 is an exemplary view illustrating the inside of a lower ironing board according to an embodiment of the present invention, FIG. 15 is a cross-sectional view taken along lines a-a of FIG. 11 according to an embodiment of the present invention, FIG. 16 is a cross-sectional view taken along lines b-b of FIG. 11 according to an embodiment of the present invention, and FIG. 17 is a cross-sectional view taken along lines c-c of FIG. 11 according to an embodiment of the present invention.

Referring to FIGS. 14 to 17, the steam ironing assembly 600 may further comprise a water recovery port 631, a water recovery connecting pipe 632, and a water moving groove 633.

Here, the water moving groove 633 is configured to form a step with the area forming the discharging pin 615, so as to surround the area forming the discharging pin 615. In other words, the water generated in the ironing unit 610 during the steam supplying process is blocked by the discharging pin 615 and bounced out, so as to move along the water moving groove 633 by the weight of water itself and inner steam pressure. Also, the water moved to the water recovery pipe 530 through the water recovery port 631 and water recovery connecting pipe 632 may be moved to the recovery tank 710.

Meanwhile, at least one heating element 620 may be insert-embedded in the lower ironing board 612 of the ironing unit 610, and preferably may be made of a ceramic heater.

The heating element 620 may consist of a sintered ceramic heating element in which a circuit forming a heating wire is printed, and an electric wire electrically connected to this circuit. The main component of the ceramic heating element is sandstone, and the sandstone contains silicon dioxide ($SiO_2$), aluminium oxide ($Al_2O$), iron oxide ($Fe_2O_3$), calcium oxide (CaO), potassium oxide ($K_2O$), magnesium oxide (MgO), manganese oxide (MnO), phosphoric acid anhydride ($P_2O_5$), barium titanate ($BaTiO_3$), etc. Since some of the components have the nature of electrically resisting conductors, both sides of the ceramic heating element conduct electricity when a current is sent, thereby releasing heat as electric resistance at that time. The ceramic heating element is a room-temperature heating element, which maintains an almost constant level of temperature, and thus the risk of overheating is very low, and the lifespan thereof is semi-permanent.

In other words, since the heating element 620 has a circuit surrounding the inside thereof, there is no concern of disconnection. Additionally, since it takes a very short time to raise the temperature to a desired temperature, the heating delay time is remarkably reduced, thereby reducing power consumption.

As such, the heating element 620 is maintained at a temperature of about 150° C., and the lower ironing board 612 is secondarily heated by the heat transfer of radiant heat to evaporate a small amount of moisture generated in the ironing unit 610, and prevent water from being injected together when the steam is injected.

Meanwhile, the steam ironing assembly 600 may further comprise a temperature sensor unit 640 installed in the lower ironing board 612 to sense the temperature of the lower ironing board 612.

More specifically, the temperature sensor unit 640 may be installed in a central portion of the lower ironing board 612, i.e., between the heating elements 620, and may sense the temperature of the lower ironing board 612 to deliver a temperature value to an external blinking part of the ironing unit 610 or an additional device so as to allow user recognition. As a method for sensing the temperature, in general, a method of using variable resistance whose resistant value may vary depending on the change in temperature may be used. It is preferable that the temperature sensor unit 640 uses a temperature sensor whose endurance is guaranteed even at a high temperature, and the sensing range thereof will be enough if it can sense a temperature from room temperature to the high-temperature steam and the temperature of the heating element 620 or above.

The steam ironing assembly 600 may further comprise an elastic rolling unit 650. The elastic rolling unit 650 is provided between the robot mounting unit 310 and the ironing unit 610, and allows the robot mounting unit 310 and the ironing unit 610 to be rolled in both directions. In other words, when the ironing unit 610 does ironing while being closely adhered to the seat cover, the elastic rolling unit 650 buffers the strong external force applied by the automated robot 300 to prevent damage to the seat cover by the strong external force, and even curved portions of the seat may be softly ironed.

The elastic rolling unit 650 is mounted between the robot mounting unit and the ironing unit 610. Since a first plate member and a second plate member may elastically move to each other, a buffer for the seat cover of the ironing unit 610 may be made.

As the steam ironing system 1000 for the vehicle seat cover comprises the steam injection assembly 200 and the steam ironing assembly 600 together, the worker may selectively use the steam injection assembly 200 or the steam ironing assembly 600 according to the type and state of the seat cover to effectively remove the wrinkles formed on the seat cover.

Meanwhile, this is simply a preferable embodiment of the present invention, and the scope of right of the present invention is not limited by the descriptions of these embodiments.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

DESCRIPTION OF REFERENCE NUMERALS

100: steam tank
200: steam injection assembly
210: casing
211: external air inlet
220: blowing unit
230: connection pipe
240: heater unit
241: air moving hole
242: first tapering unit
243: second tapering unit
250: steam discharge guiding unit
260: first steam supplying pipe
270: baffle
300: automated robot
310: robot mounting unit
311: mounting plate
320: robot arm
400: steam supplying unit
500: water recovery unit
510: housing body
511: water recovery inlet
512: blocking wall
513: travel passage
515: fixed coupling unit
520: inner pipe
521: blocking unit
522: steam entering hole
530: water recovery pipe
600: steam ironing assembly
610: ironing unit
611: upper cover
612: lower ironing board
614: steam inlet
615: discharging pin
616: steam injection hole
620: heating element
631: water recovery port
632: water recovery connecting pipe
633: water moving groove 640: temperature sensor unit
650: elastic rolling unit
660: second steam supplying pipe
710: recovery tank
720: water supply tank
1000: steam ironing system for vehicle seat cover

What is claimed is:

1. A steam ironing system for a vehicle seat cover, comprising:
   a steam tank for heating water to generate steam;
   a steam injection assembly for receiving the steam generated from the steam tank and injecting the steam to the vehicle seat at a predetermined interval from the vehicle seat;
   an automated robot for guiding a movement of the steam injection assembly;
   a steam ironing assembly, coupled to a robot mounting unit provided in the automated robot with the steam injection assembly, for receiving the steam generated from the steam tank and ironing the vehicle seat;
   a steam supplying unit for supplying the steam to the steam injection assembly or the steam ironing assembly, one end thereof being connected to the steam tank;
   a water recovery unit detachably connected to the steam supplying unit, for recovering water generated in the steam supplying unit during a steam supplying process;
   a steam supply controlling unit for selectively supplying the steam via the water recovery unit to the steam injection assembly or the steam ironing assembly; and
   a recovery tank for storing water recovered from the water recovery unit,
   wherein the steam injection assembly, comprises:
   a casing provided with an inner space;
   a blowing unit provided in the casing;
   a connection pipe coupled to the casing while forming a hollow;
   a heater unit provided in the connection pipe;
   a steam discharge guiding unit, coupled to the connection pipe, for guiding a blowing direction of air discharged from the blowing unit;
   a baffle, provided between the connection pipe and the steam discharge guiding unit, for dispersing hot air heated by the heater unit which moves from the connection pipe to the steam discharge guiding unit; and
   a first steam supplying pipe, provided inside the steam discharge guiding unit, for discharging the steam supplied from the steam supplying unit.

2. The system of claim 1, wherein the first steam supplying pipe, provided inside the steam discharge guiding unit, is formed to make a spiral along a longitudinal direction of the steam discharge guiding unit, and
   wherein a plurality of air moving holes having predetermined intervals are formed in the heater unit, so that the air flowed into one end of the heater unit through the air moving hole is heated by the heater unit, and then discharged to another end of the heater unit.

3. The system of claim 1, wherein the steam discharged from the first steam supplying pipe is injected to the vehicle seat while being heated to a predetermined temperature or above by the hot air heated by the heater unit.

4. The system of claim 1, wherein the steam ironing assembly, comprises:
   an ironing unit which includes a plurality of steam injection holes, and a plurality of discharging pins provided to be in communication with the steam injection holes and has an inner passage; and
   at least one heating element, embedded in the ironing unit, for heating the water generated in the ironing unit for evaporation,
   wherein the ironing unit comprises an upper cover with at least one steam inlet in communication with a second steam supplying unit; and a lower ironing board coupled to the upper cover and formed with the discharging pin,
   wherein the upper cover and the lower ironing board are coupled to each other so that a steam circulation space in which the steam circulates is formed inside the ironing unit.

5. The system of claim 4, wherein the heating element is made of a ceramic heater and is insert-embedded in the lower ironing board.

6. The system of claim 4, wherein the steam ironing assembly, further comprises:
   a water recovery port, provided in the upper cover, for recovering water generated in the ironing unit;
   a water recovery connecting pipe, connected to the water recovery port, for guiding the water generated in the ironing unit to the recovery tank; and
   a water moving groove formed along an inner periphery of the lower ironing board, and configured to move the water generated in the ironing unit towards the water recovery port,
   wherein at least one inclination part is formed on the top of the discharging pin.

* * * * *